(12) United States Patent
Alexandersson et al.

(10) Patent No.: US 10,346,472 B2
(45) Date of Patent: Jul. 9, 2019

(54) METHOD AND A PORTABLE ELECTRONIC DEVICE FOR AUTOMATICALLY RATING A MUSIC TRACK

(75) Inventors: Petter Alexandersson, Bjärred (SE); Jenny Fredriksson, Malmö (SE)

(73) Assignee: SONY Corporation, Tokyo (JP)

( * ) Notice: Subject to any disclaimer, the term of this patent is extended or adjusted under 35 U.S.C. 154(b) by 465 days.

(21) Appl. No.: 14/373,149

(22) PCT Filed: Jan. 23, 2012

(86) PCT No.: PCT/EP2012/050981
§ 371 (c)(1),
(2), (4) Date: Aug. 14, 2014

(87) PCT Pub. No.: WO2013/110317
PCT Pub. Date: Aug. 1, 2013

(65) Prior Publication Data
US 2015/0067509 A1    Mar. 5, 2015

(51) Int. Cl.
*G06F 3/0484* (2013.01)
*G06F 17/30* (2006.01)
*G06F 16/68* (2019.01)
*G06Q 30/02* (2012.01)
*G11B 27/32* (2006.01)
*G11B 27/34* (2006.01)

(52) U.S. Cl.
CPC ........ *G06F 16/686* (2019.01); *G06F 3/04842* (2013.01); *G06Q 30/02* (2013.01); *G11B 27/322* (2013.01); *G11B 27/34* (2013.01)

(58) Field of Classification Search
CPC .......... G06F 17/30752; G06F 3/04842; G06F 17/30772; G06F 17/30749; G06F 17/30053; G06F 17/30743; G06F 17/30758; G06F 17/30766; G06F 17/30867; G06Q 30/02; G11B 27/322; G11B 27/34
See application file for complete search history.

(56) References Cited

U.S. PATENT DOCUMENTS 8,396,800 B1 *  3/2013  Wieder .............. H04L 67/306
                                                          705/50
9,202,520 B1 * 12/2015  Tang ..................... G11B 27/00
2005/0163481 A1  7/2005  Hirai
(Continued)

FOREIGN PATENT DOCUMENTS

WO    WO 2009/047197 A1    4/2009

OTHER PUBLICATIONS

Gordon "Ignore Tracks You've Recently Skipped in Itunes", http://lifehacker.com/5836342/ignore-tracks-youve-recently-skipped-in-itunes-smart-playlists, published 2011.*
(Continued)

*Primary Examiner* — Tan H Tran
(74) *Attorney, Agent, or Firm* — Myers Bigel, P.A.

(57) ABSTRACT

A portable electronic device for automatically rating a music track comprised in a set of music tracks and a method therein are provided. The portable electronic device detects at least one user interaction during performance of the music track. Next, the portable electronic device adjusts a rating of the music track based on the detected at least one user interaction, thereby automatically rating the music track.

15 Claims, 1 Drawing Sheet

(56) References Cited

U.S. PATENT DOCUMENTS

2006/0259355 A1* 11/2006 Farouki ............... G06Q 10/101
  705/300
2006/0294131 A1   12/2006 Hsieh et al.
2009/0270170 A1   10/2009 Patton
2010/0332440 A1* 12/2010 Brodsky ............ G06Q 30/0244
  706/52

OTHER PUBLICATIONS

International Search Report and Written Opinion of the International Searching Authority, PCT Application No. PCT/EP2012/050981, dated Sep. 21, 2012.

Kuhn et al., "Sensing Dance Engagement for Collaborative Music Control", *IEEE 15th Annual International Symposium on Wearable Computers (ISWC)*, Jun. 12, 2011, pp. 51-54.

* cited by examiner

METHOD AND A PORTABLE ELECTRONIC DEVICE FOR AUTOMATICALLY RATING A MUSIC TRACK

CROSS REFERENCE TO RELATED APPLICATION

This application is a 35 U.S.C. § 371 national stage application of PCT International Application No. PCT/EP2012/050981, filed on 23 Jan. 2012, the disclosure and content of which is incorporated by reference herein in its entirety. The above-referenced PCT International Application was published in the English language as International Publication No. WO 2013/110317 A1 on 1 Aug. 2013.

TECHNICAL FIELD

Embodiments herein relate to a method in a portable electronic device for automatically rating a music track comprised in a set of music tracks. Furthermore, embodiments herein relate to a portable electronic device for automatically rating of a music track comprised in a set of music tracks.

BACKGROUND

With today's modern mobile devices a user may listen to music, which may be stored locally in the mobile device or remotely in a server providing a music service. The user usually creates a library of comprising a number of music tracks.

Often when the user shall listen to music while using the mobile device, the user shuffles all music tracks to get served a variety of music. When the music tracks are shuffled, all music tracks in the library are mixed. Since it is time consuming to go through the library and delete old songs that the user don't like anymore, both the favourites and other non-favourable music tracks are mixed. To go through the library and manually rate each track, i.e. set a rating for each track, is a cumbersome process. Music libraries of users are increasing in number of music tracks rapidly, thanks to music services like Spotify and similar.

WO 2009047197 is directed to a method and system for applying ratings to digital music and for playing back digital music conforming to a rating level. The known method for playing back digital music conforming to a rating level, includes: sending a request for metadata from a music player to a metadata service; receiving metadata sent back from the metadata service in response to the request, the metadata comprising information regarding at least one explicit interval of the track; playing the track on the music player; and selectively applying an edit to each explicit interval of the playing track identified in the metadata, based on a predetermined rating level.

SUMMARY

An object is to provide an improved method for rating of a music track comprised in a set of music tracks.

According to an aspect, the object is achieved by a method in a portable electronic device for automatically rating a music track comprised in a set of music tracks. The portable electronic device detects at least one user interaction during performance of the music track. Next, the portable electronic device adjusts a rating of the music track based on the detected at least one user interaction, thereby automatically rating the music track.

According to another aspect, the object is achieved by a portable electronic device for automatically rating a music track comprised in a set of music tracks. The portable electronic device comprises a processing circuit configured to detect at least one user interaction during performance of the music track. Furthermore, the processing circuit is configured to adjust a rating of the music track based on the detected at least one user interaction, whereby the music track is automatically rated.

Thanks to that the portable electronic device detects at least one user interaction, such as singing, dancing etc by the user, during performance, eg. playback by the electronic device, of the music track, the portable electronic device is able to detect user interactions which may be implicitly related to rating of music tracks. A music track may comprise audio and/or video data. Next, the portable electronic device adjusts, or sets, the rating of the music track while taking the detected at least one user interaction into account. In this manner, the rating of the music track is automatically adjusted, or set.

As an example, the portable electronic device detects that the user sings along with music from a music track played by the portable electronic device. Then, the rating of the music track is increased since the singing indicates that the user likes the music from the music track. It may even be that the portable electronic device measures a time period during which the user sings. Then, the longer the time period is the higher the rating of the music track may be.

An advantage is that the music track, or music tracks, of set of music tracks may be automatically rated without the need for user interaction explicitly related to setting of the rating of the music track. Such user interaction explicitly related to setting of the rating of the music track may include selecting a music track and then manually setting the rating of the music track by for example selecting a rating from a list of rating values.

Further features of, and advantages with, the embodiments herein will become apparent when studying the appended claims and the following detailed description. Those skilled in the art will realize that different features of embodiments may be combined to create embodiments other than those described in the following, without departing from the scope as defined by the appended claims.

BRIEF DESCRIPTION OF THE DRAWINGS

The various aspects of embodiments, including its particular features and advantages, will be readily understood from the following detailed description and the accompanying drawings, in which.

DETAILED DESCRIPTION

Embodiments will now be described more fully with reference to the accompanying drawings. However, this description should not be construed as limiting the scope of protection to the embodiments set forth herein. Disclosed features of example embodiments may be combined as readily understood by one of ordinary skill in the art. Like numbers refer to like elements throughout. Well-known functions or constructions will not necessarily be described in detail for brevity and/or clarity.

Figure 1:
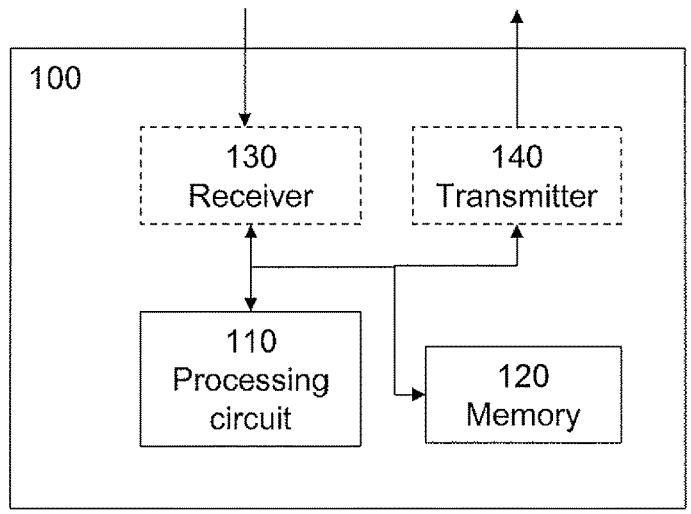
FIG. 1 is a schematic block diagram of an exemplifying portable electronic device.

In FIG. 1, a schematic block diagram of an exemplifying portable electronic device 100 is shown. The portable electronic device 100 may be a cellular phone, a smartphone, an mp3-player, a wireless portable electronic device, a portable communication device, a portable radio communication device or the like.

A more detailed description of the configuration of the portable electronic device 100 will follow after the description of some exemplifying embodiments.

In the following examples, a music track to be rated may be an audio and/or video file, such as an mp3-file, wav-file, mp4file, avi-file, ogg-file or the like. The music track is comprised in a set of music tracks, such as a library of audio and/or video files. The library may be specific for each user of the portable electronic device 100, i.e. each user has its own library.

According to a first exemplifying method for automatically rating the music track comprised in the set of music tracks the following actions may be performed.

The portable electronic device 100 detects, see also action 101 below, that the user sings along with the music originating from the music track being played back by the portable electronic device 100.

Then, the portable electronic device 100 increases, see also action 105 below, the rating of the music track. In some examples, the portable electronic device 100 measures, see also action 102 below, the duration of the singing by the user. If the user sings during the entire music track, the increase of the rating may be greater than the increase of the rating when the user only sings during a portion of the music track. There may be set a threshold for the duration of the singing such that when the user sings along for very short period, no increase of the rating of the music track is effectuated.

According to a second exemplifying method for automatically rating the music track comprised in the set of music tracks the following actions may be performed.

The portable electronic device 100 detects, see also action 101 below, that the user dances to music originating from the music track being played back by the portable electronic device 100.

Then, the portable electronic device 100 increases, see also action 105 below, the rating of the music track. In some examples, the portable electronic device 100 measures, see also action 102 below, the duration of the dancing by the user. If the user dances during the entire music track, the increase of the rating may be greater than the increase of the rating when the user only dances during a portion of the music track. Similarly to the preceding example, there may be set a threshold for the duration of the dancing such that when the user dances along for very short period, no increase of the rating of the music track is effectuated.

According to a third exemplifying method for automatically rating the music track comprised in the set of music tracks the following actions may be performed.

In an action, see also action 101 below, the portable electronic device 100 detects that the user skips the music track three times within seven days. Three and seven may be replaced by any suitable numbers. In this example, the music track is played back by the portable electronic device 100.

Then, the portable electronic device 100 decreases, see also action 106 below, the rating of the music track. In some examples, the portable electronic device 100 measures, see also action 103 below, the time before the user skips the music track. If the user skips the music track when only a few bars has been played, the decrease may be greater than for a case where almost the entire music track has been played before the user skips the music track. Again, similarly to the above, a threshold may be set such that if for example more than 80% of the music track has been played before the user skips the track, there will be no decrease of the rating.

Figure 2:
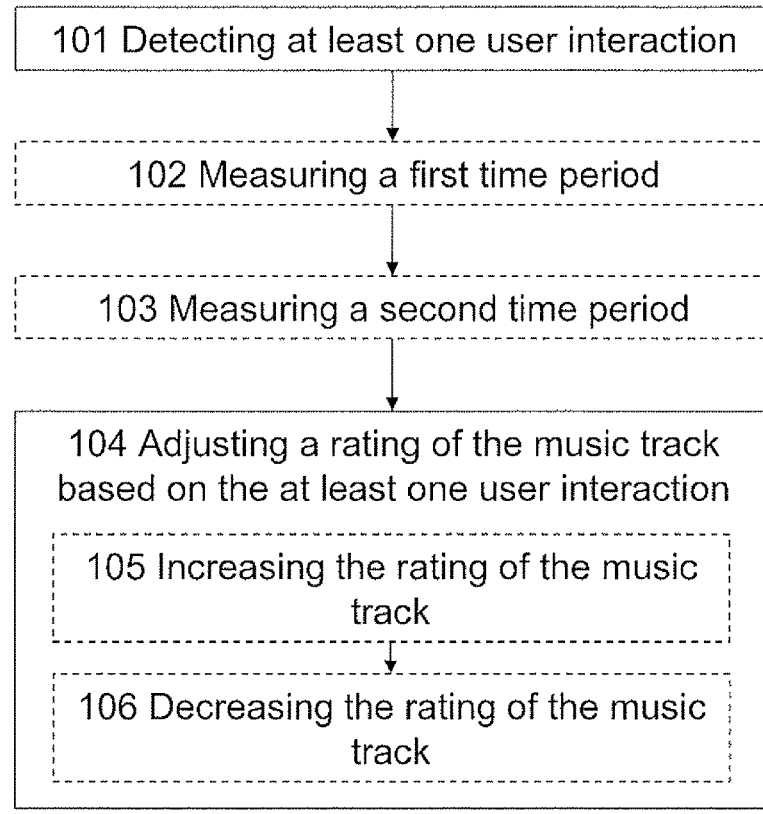
FIG. 2 is a schematic flow chart over an exemplifying method in accordance with embodiments presented herein.

Now turning to FIG. 2, further exemplifying methods in the portable electronic device 100 for automatically rating a music track comprised in a set of music tracks are described.

The term "automatically" may be understood as meaning without user interaction explicitly relating to setting of the rating for the music track. User interaction explicitly relating to the setting of the rating may be that the user points, or selects, a music track and sets the rating by for example clicking or touching a rating shown in a list of ratings. Thus, the user interaction may be implicitly related to rating of the music track.

The rating may be used for prioritisation of tracks; e.g. which songs to play in shuffle mode, suggestion for which songs to be added to a favourite list etc. Music tracks may e.g. be given rating, such as a rating value between 1 and 100.

According to embodiments herein, the user interaction may comprise a singing, by a user of the portable electronic device 100, along with the music track, a dance, by a user of the portable electronic device 100, a skipping of the music track and/or a combination thereof. Expressed differently, the user interaction may comprise that the user sings along with the music track, that the user dances to the music originating from the music track, that the user skips the music track and/or a combination thereof. The portable electronic device 100 may identify a movement pattern as dancing. This may also be applied when the music track is not played by the device per se, e.g. when the user is attending a concert. If the same music track is found in the set of music tracks, the music track will get a higher rating.

According further embodiments, the user interaction may comprise an increase of the volume, a "repeat track" selection, a play selection, a favourite addition and an approval action in a social network. One or more of these exemplifying user interactions may be combined with one or more of the aforementioned user interactions, such as the singing, dancing, skipping etc. Expressed differently, the user interaction may comprise that the user increases the volume, presses/selects "repeat" or "play" for the music track, that the user adds the music track as a favourite track in a list of favourites and/or that the user expresses his/her approval to the music track via a social network. The last example may be that the user selects "like" on Facebook for the music track. In case, the user interaction comprises that the electronic device 100 detects selection of "repeat" and/or "play", the number of selections of "repeat" and/or "play" is decisive for the amount of the increase of the rating. For example, merely one selection of "play" may be considered to be below some threshold value and would hence not yield an increase in rating at all.

The following actions may be performed. The order of the actions may be different from what is indicated below and/or in FIG. 2.

Action 101

The portable electronic device 100 detects at least one user interaction during performance of the music track.

The performance of the music track may comprise playback, by the portable electronic device 100, of the music track; and/or detection, by the portable electronic device 100, of sound relating to the music track, wherein the sound originates from another source. As an example, the detection of sound relating to the music track may be picked up by a microphone, comprised in the portable electronic device 100, during a concert or the like.

Action 102

The portable electronic device 100 may measure a first time period during which said at least one user interaction is detected. With reference to the examples above, the first time period may be indicative of the duration of the singing or dancing by the user. The first time period may be applicable both in Karaoke mode and normal play. This may be applied by that a Query by a humming system is applied in the background in order to identify the tones and compare them to the music track in the set or a database, such as a music/video library.

Action 103

The portable electronic device 100 measures a second time period during which the music track is played before detection of said at least one user interaction. With reference to the examples above, the second time period may be indicative of the length of the music track played back before the user skips the music track.

Action 104

The portable electronic device 100 adjusts a rating of the music track based on the detected at least one user interaction, thereby automatically rating the music track. The adjustment of the rating of the music track may be performed stepwise, in steps of 1, 2, 3, etc. Even if there is no rating of the music track, it may be said that the rating is adjusted since the rating is adjusted from being zero, or non-existing, to be a rating, such as a rating value. Further, the rating may be set by the portable electronic device 100 thus no being depended on a previous rating. The setting of the rating of the music track may be based on different measures as illustrated below with reference to a first and a second time period.

Action 105

As mentioned above, said at least one user interaction may comprise a singing, by a user of the portable electronic device 100, along with the music track, and/or a dance, by a user of the portable electronic device 100.

In this action the adjusting of the rating of the music track may be performed by that the portable electronic device 100 increases the rating of the music track in response to the detection of said at least one user interaction. As an example, the rating may be increased by one step, where the step may be 1, 2, 3 etc as mentioned above. The increasing 105 may be performed when the first time period is above a first threshold value. The first threshold value may a first absolute time period, such as 30 s, 1 min etc., or a first relative time period defined as a first ratio multiplied by the length of the music track. The first ratio may be e.g. 30%. The first ratio may be predefined or selectable by the user.

In some examples, the adjusting may be performed by setting the rating of the music track. Thus, as an example the rating may be set to 50 on a 1 to 100 scale, when the user sings and/or dances during half of the music track.

Action 106

As mentioned above, said at least one user interaction may comprise a skipping of the music track.

Then, in this action, the adjusting of the rating of the music track may be performed by that the portable electronic device 100 decreases the rating of the music track when the music track is skipped a first number of times within a time interval. As an example, the rating may be decreased by one step, where the step may be 1, 2, 3 etc as mentioned above. The first number may e.g. be three. The time interval may e.g. be seven days. The first number and/or the time interval may be predefined or selectable by the user. The decreasing 106 may be performed when the second time period is below a second threshold value. The second threshold value may be a second absolute time period or a second relative time period defined as a second ratio multiplied by the length of the music track. The second ratio may be e.g. 20%. The second ratio may be predefined or selectable by the user. The shorter time the music track is played, the lower rating. The time played in relation to the time of the full track may result in increase or decrease in rating of the track.

In some examples, the adjusting may be performed by setting the rating of the music track. Thus, as an example the rating may be set to 15 on a 1 to 100 scale, when the user skips the music track when 15% of the length of the music track has been played back.

As mentioned above, said at least one user interaction may comprise a singing, by a user of the portable electronic device 100, along with the music track, and/or a dance, by a user of the portable electronic device 100. Then, in this action, the decreasing 106 may be performed when the second time period is above the second threshold value. That is to say, the second time period is indicative of when the user began to dance or sing. If the user did not begin to dance or sing until after the second threshold vales had passed, the rating of the music track may be decreased. However, should it be that the user continues to dance such that e.g. more than half of the music track is being danced to, an increase of the rating may still be the correct action.

Returning to FIG. 1, the exemplifying portable electronic device 100 for automatically rating a music track comprised in a set of music tracks is shown.

According to embodiments herein, the user interaction may comprise a singing, by a user of the portable electronic device 100, along with the music track, a dance, by a user of the portable electronic device 100, a skipping of the music track and/or a combination thereof. Expressed differently, the user interaction may comprise that the user sings along with the music track, that the user dances to the music originating from the music track, that the user skips the music track and/or a combination thereof. The portable electronic device 100 may identify a movement pattern as dancing. This may also be applied when the music track is not played by the device per se, e.g. when the user is attending a concert. If the same music track is found in the set of music tracks, the music track will get a higher rating. As mentioned, the user interaction may be implicitly related to rating of the music track.

The portable electronic device 100 comprises a processing circuit 110 configured to detect at least one user interaction during performance of the music track. Said performance of the music track may comprises playback, by the portable electronic device 100, of the music track; and/or detection, by the portable electronic device 100, of sound relating to the music track, wherein the sound originates from another source.

Furthermore, the processing circuit 110 is configured to adjust a rating of the music track based on the detected at least one user interaction, whereby the music track is automatically rated.

The processing circuit 110 may further be configured to increase the rating of the music track in response to the detection of said at least one user interaction, such as dancing and singing by the user. The processing circuit 110 may further be configured to measure a first time period during which said at least one user interaction is detected. The processing circuit 110 may further be configured to perform the increase when the first time period is above a first threshold value. The first threshold value may be a first absolute time period or a first relative time period defined as a first predefined ratio multiplied by the length of the music track.

The processing circuit 110 may further be configured to decrease the rating of the music track when the music track is skipped a first number of times within a time interval. The processing circuit 110 may further be configured to measure a second time period during which the music track is played before detection of said at least one user interaction. The processing circuit 110 may further be configured to perform the decreasing 106 when the second time period is below a second threshold value. The second threshold value may be a second absolute time period or a second relative time period defined as a second predefined ratio multiplied by the length of the music track.

The portable electronic device 100 further comprises a memory 120. The memory 120 may be a hard disk, a magnetic storage medium, a portable computer diskette or disc, a flash memory, a random access memory (RAM) or the like. Furthermore, the memory may be an internal register memory of the processing circuit 110.

According to embodiments, in which the portable electronic device 100 is a portable communication device, such as a smart phone or the like, the device 100 may further comprise a receiver 130 and/or a transmitter 140.

Example embodiments described above may be combined as understood by a person skilled in the art. Although the invention has been described with reference to example embodiments, many different alterations, modifications and the like will become apparent for those skilled in the art.

Therefore, it is to be understood that the foregoing is illustrative of various example embodiments and the invention is not to be limited to the specific embodiments disclosed and that modifications to the disclosed embodiments, combinations of features of disclosed embodiments as well as other embodiments are intended to be included within the scope of the appended claims.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method in a portable electronic device for automatically rating a set of music tracks, the method comprising:
    detecting a first user interaction during performance of a first music track comprised in the set of music tracks;
    measuring a first time period between when the first music track starts playing and timing of detection of the first user interaction;
    adjusting a rating of the first music track based on the detected first user interaction, thereby automatically rating the first music track,
    detecting a second user interaction during performance of a second music track comprised in the set of music tracks;
    measuring a second time period between when the second music track starts playing and timing of detection of the second user interaction;
    adjusting a rating of the second music track based on the detected second user interaction, thereby automatically rating the second music track;
    detecting a third user interaction during performance of a third music track comprised in the set of music tracks; and
    adjusting a rating of the third music track based on the detected third user interaction, thereby automatically rating the third music track,
    wherein the first user interaction comprises a skipping of the first music track,
    wherein the second user interaction comprises a singing, by a user of the portable electronic device and which is detected by sensing sound using the portable electronic device, along with the second music track, and/or a dancing, by the user of the portable electronic device and which is detected by sensing movement of the portable electronic device,
    wherein the third user interaction comprises a singing, by the user of the portable electronic device, along with a performance of the third music track by a device other than the portable electronic device, which is detected by sensing sound using the portable electronic device, and/or a dancing, by the user of the portable electronic device, along with the performance of the third music track by the device other than the portable electronic device, which is detected by sensing movement of the portable electronic device,
    wherein the adjusting of the rating of the first music track comprises decreasing the rating of the first music track based on determining that the first music track is skipped at least a first plurality of times within a defined time interval, and based on determining that the first time period is shorter than a first threshold value,
    wherein the adjusting the rating of the second music track comprises increasing the rating of the second music track responsive to detection of the second user interaction, responsive to a duration of the second user interaction, and responsive to determining that the second time period is longer than a second threshold value, and
    wherein the adjusting the rating of the third music track comprises increasing the rating of the third music track responsive to detection of the third user interaction.

2. The method according to claim 1, wherein the first threshold value is an absolute time period or a relative time period defined as a predefined ratio multiplied by a length of the first music track.

3. The method according to claim 1, wherein the second threshold value is an absolute time period or a relative time period defined as a predefined ratio multiplied by a length of the second music track.

4. The method according to claim 1, wherein said performance of the second music track comprises:
    detection, by the portable electronic device, of sound relating to the second music track, wherein the sound originates from a source other than the portable electronic device.

5. The method according to claim 1, further comprising maintaining the rating of the first music track to be constant until the first music track is skipped at least the first plurality of times within the defined time interval.

6. The method according to claim 1, wherein the first plurality of times is greater than two times.

7. The method according to claim 1, wherein the first plurality of times is three times.

8. The method according to claim 1, wherein the first music track and second music track are different music tracks.

9. The method according to claim 1, wherein the first threshold value and second threshold value are different threshold values.

10. A portable electronic device for automatically rating a music track comprised in a set of music tracks, comprising:
a processing circuit configured to detect first, second, and third user interactions during performances of first, second, and third music tracks, respectively; wherein the processing circuit is further configured to measure a first time period between when the first music track starts playing and timing of detection of the first user interaction and measure a second time period between when the second music track starts playing and timing of detection of the second user interaction; and wherein the processing circuit is further configured to adjust a rating of the first music track based on the detected first user interaction, adjust a rating of the second music track based on the detected second user interaction, and adjust a rating of the third music track based on the detected third user interaction, whereby the first, second, and third music tracks are automatically rated,
wherein the first user interaction comprises a skipping of the first music track,
wherein the second user interaction comprises dancing to and/or singing along with the second music track,
wherein the third user interaction comprises a singing along with a performance of the third music track by a device other than the portable electronic device and/or a dancing along with the performance of the third music track by the device other than the portable electronic device,
wherein the adjusting of the rating of the first music track comprises decreasing the rating of the first music track based on determining that the first music track is skipped a plurality of times within a defined time interval and based on determining that the first time period is shorter than a first threshold value,
wherein the adjusting of the rating of the second music track comprises increasing the rating of the second music track based on detecting the second user interaction, based on a duration of the second user interaction, and based on determining that the second time period is longer than a second threshold value, and
wherein the adjusting of the rating of the third music track comprises increasing the rating of the third music track based on detecting the third user interaction.

11. The portable electronic device according to claim 10, wherein the processing circuit further is configured to maintain the rating of the music track to be constant until the music track is skipped at least the plurality of times within the defined time interval.

12. The portable electronic device according to claim 10, wherein the plurality of times is greater than two times.

13. The portable electronic device according to claim 10, wherein the plurality of times is three times.

14. The portable electronic device according to claim 10, wherein the first music track and second music track are different music tracks.

15. The portable electronic device according to claim 10, wherein the first threshold value and second threshold value are different threshold values.

* * * * *